United States Patent
Ding et al.

(10) Patent No.: US 9,952,078 B2
(45) Date of Patent: *Apr. 24, 2018

(54) UPSTREAM VOLUME MASS FLOW VERIFICATION SYSTEMS AND METHODS

(71) Applicant: MKS Instruments, Inc., Andover, MA (US)

(72) Inventors: Junhua Ding, Boxborough, MA (US); Kaveh H. Zarkar, Andover, MA (US)

(73) Assignee: MKS Instruments, Inc., Andover, MA (US)

(*) Notice: Subject to any disclaimer, the term of this patent is extended or adjusted under 35 U.S.C. 154(b) by 630 days.

This patent is subject to a terminal disclaimer.

(21) Appl. No.: 14/304,463

(22) Filed: Jun. 13, 2014

(65) Prior Publication Data

US 2015/0066395 A1 Mar. 5, 2015

Related U.S. Application Data

(63) Continuation of application No. 12/508,799, filed on Jul. 24, 2009, now Pat. No. 8,793,082.

(51) Int. Cl.
| | |
|---|---|
| *G01F 1/00* | (2006.01) |
| *G01F 1/80* | (2006.01) |
| *G01F 5/00* | (2006.01) |
| *G01F 25/00* | (2006.01) |

(52) U.S. Cl.
CPC ............... *G01F 1/80* (2013.01); *G01F 5/00* (2013.01); *G01F 25/00* (2013.01); *G01F 25/0038* (2013.01); *G01F 25/0053* (2013.01)

(58) Field of Classification Search
CPC ........................................................ G01F 1/80
USPC .................................................................. 702/47
See application file for complete search history.

(56) References Cited

U.S. PATENT DOCUMENTS

| | | | |
|---|---|---|---|
| 6,763,731 B1 | 7/2004 | Harvey | |
| 8,793,032 B2 | 7/2014 | Ding et al. | |
| 8,793,082 B2* | 7/2014 | Ding ................ | G01F 5/00 |
| | | | 702/47 |
| 2003/0234044 A1 | 12/2003 | Shajii et al. | |
| 2006/0275276 A1 | 12/2006 | Tanaka et al. | |
| 2006/0278276 A1* | 12/2006 | Tanaka ............ | G01F 1/6847 |
| | | | 137/487.5 |
| 2007/0288180 A1 | 12/2007 | Lull et al. | |

(Continued)

FOREIGN PATENT DOCUMENTS

WO 2011011255 A3 1/2011

OTHER PUBLICATIONS

International Search Report and the Written Opinion from corresponding PCT Application No. PCT/US10/042100 dated Apr. 3, 2011.

*Primary Examiner* — Toan Le
*Assistant Examiner* — Xiuquin Sun
(74) *Attorney, Agent, or Firm* — McDermott Will & Emery LLP

(57) ABSTRACT

This disclosure relates to mass flow verification systems for and methods of measuring and verifying the mass flow through a mass flow delivery/measurement device such as a mass flow controller. A mass flow verification system comprises a preset volume, a temperature sensor, and a pressure sensor. The measured verified flow determined by the mass flow verification system can be adjusted to compensate for errors resulting from a dead volume within the mass flow measurement device.

12 Claims, 3 Drawing Sheets

(56) References Cited

U.S. PATENT DOCUMENTS

2009/0078055 A1* 3/2009 Lull ...................... G01F 1/696
  73/861
2011/0022334 A1 1/2011 Ding et al.
2011/0087189 A1* 4/2011 Jacobson .......... A61M 5/16827
  604/506
2012/0174992 A1* 7/2012 Shajii .................. G05D 7/0635
  137/486

* cited by examiner

UPSTREAM VOLUME MASS FLOW VERIFICATION SYSTEMS AND METHODS

This application is a continuation application of U.S. patent application Ser. No. 12/508,799 filed Jul. 24, 2009 entitled UPSTREAM VOLUME MASS FLOW VERIFICATION SYSTEMS AND METHODS, the entire contents of which is incorporated herein by reference.

BACKGROUND OF THE DISCLOSURE

A number of high-precision mass flow measurement systems are useful in materials processing. These high-precision mass flow measurement systems may include, but are not limited to, mass flow controllers (MFCs) and mass flow meters (MFMs). While this disclosure applies to all mass flow measurement systems and methods, reference will only be made to MFCs hereafter for illustration purposes only and not by way of limitation.

It may be desirable and sometimes necessary to test or verify the accuracy of an MFC. One way to verify the accuracy of an MFC is through the use of a rate of decay, mass flow verifier (MFV) positioned upstream of the MFC under test.

Sometimes, however, measurement errors may occur due to structural aspects of the flow path that introduce undesirable pressure variations which affect the measurement of the MFV and MFC. For example, MFCs have a portion of the flow path between the flow sensor and the control valve called the "dead volume" which can introduce errors in flow measurement, especially if the MFC is a non-pressure insensitive (i.e., pressure sensitive) MFC which does not have a pressure sensor inside the MFC. The non-pressure insensitive MFC cannot compensate for the flow rate error caused by the pressure fluctuation. As fluid flows along the flow path from the flow verifier through the dead volume and out of the MFC, the dead volume may cause inaccuracies in the pressure measurements and ultimate flow verification.

SUMMARY OF THE DISCLOSURE

Accordingly, a mass flow verifier (MFV) is described in this disclosure that compensates for errors arising from a dead volume in a non-pressure insensitive MFC.

This disclosure more specifically describes upstream verification systems and methods for measuring and verifying mass flow through a non-pressure insensitive MFC. The upstream positioned MFV typically includes a chamber defining a fixed volume, an input valve receiving a fluid from a source and controlling the flow of fluid into the chamber, and an output valve for controlling the flow of fluid out of the chamber into the test MFC. By opening the input valve and closing the output valve, the chamber receives fluid from the source such that the pressure is allowed to rise to a determined level. Once at the determined level, the input valve can be closed, and the output valve opened so that fluid flows form the chamber into the MFC under test. By measuring the temperature of the fluid in the chamber, and the rate of decay of pressure from the chamber, the flow rate through the MFC can be independently measured so that the MFC performance can be independently measured and verified. The calculated flow rate is compensated to account for errors due to any dead volume within the non-pressure insensitive mass flow controller.

If the test mass flow controller is a pressure insensitive one, then the flow rate calculation by the upstream MFV can be performed presuming a zero dead volume. The value of the dead volume can be provided by the manufacturer of the mass flow controller.

DETAILED DESCRIPTION OF THE DISCLOSURE

One way to verify the accuracy of an MFC is through a mass flow verifier upstream of the MFC under test. As stated previously, the flow rate through the MFC under test can be measured and verified by measuring the rate of decay in pressure and change in temperature as the fluid flows from the MFV chamber to the MFC under test. Measurement errors, however, may result from a dead volume present in the test MFC, particularly if the MFC is non-pressure insensitive. Compensating for these measurement errors is the subject of this disclosure.

Figure 1:
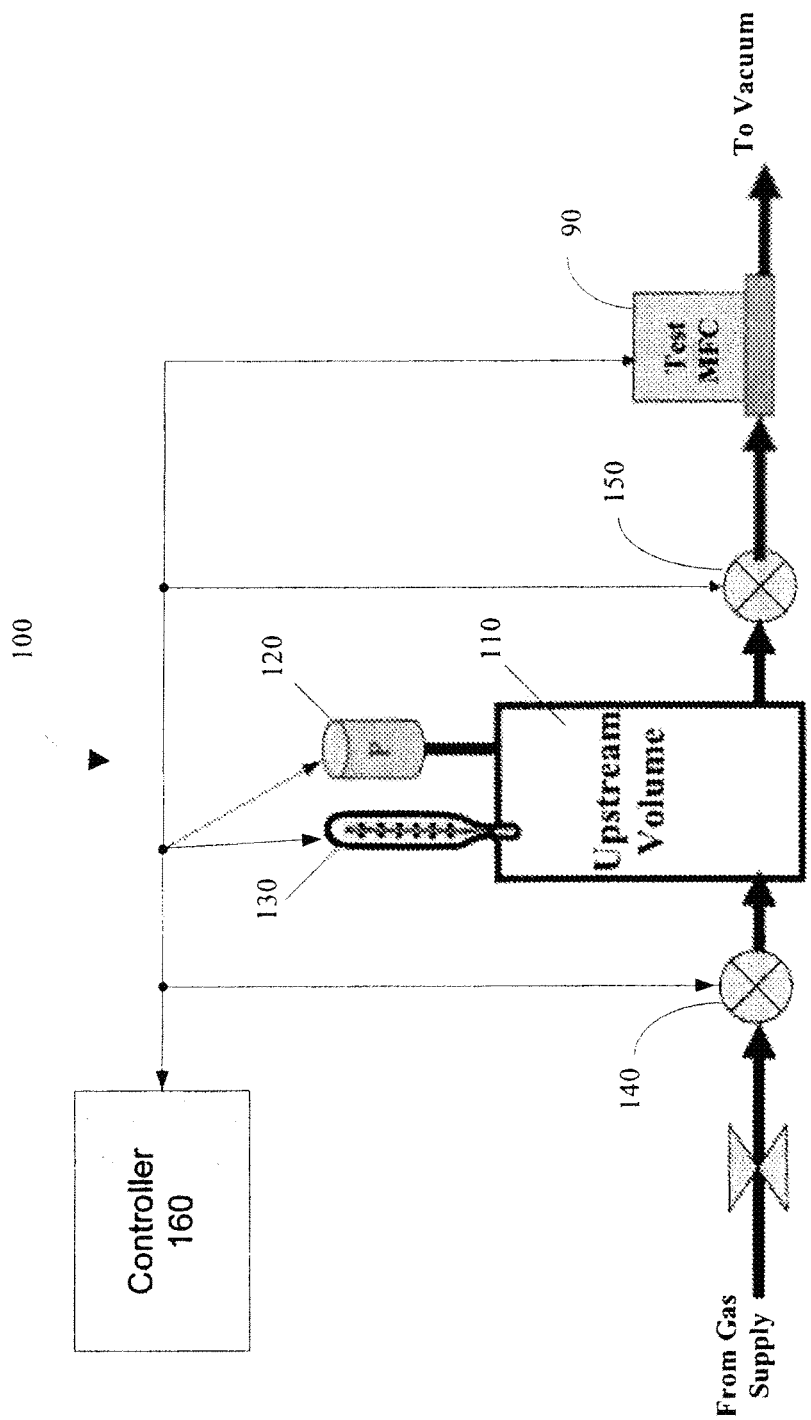
FIG. 1 is a block diagram in accordance with one aspect of the present disclosure.

FIG. 1 exhibits an embodiment of an upstream MFV system 100 for verifying the performance of a test MFC 90. A typical upstream flow verifier includes a chamber defining a known volume ($V_c$) 110, a pressure transducer (P) 120, a temperature sensor (T) 130, and two isolation control valves, where one is upstream 140 and the other is downstream 150 of the volume.

The illustrated embodiment of an MFV includes a temperature sensor 130 and a pressure transducer 120. As shown, the upstream input valve 140 is used to control fluid flowing from a source or supply of test gas, while the down stream valve 150 is used to control the flow of fluid from the volume 110 to the test MFC 90. A controller 160 is used to operate the valves 140 and 150, and to receive data representative of the temperature of the volume 110 (as measured by temperature sensor 130), and the pressure within the volume 110 (as measure by the pressure transducer 120). Further, the controller can also set the flow of the test MFC (although a separate controller may also be used to control the MFC). By opening the input valve 140 and closing the output valve 150, the chamber volume 110 receives fluid from the source such that the pressure, as measure by transducer 120 is allowed to rise to a determined level. Once at the determined level, the input valve 140 can be closed. The MFC 90 can now be tested. With the input valve 140 remaining closed, the output valve 150 is opened so that fluid flows from the chamber 110 into the MFC 90 under test. By measuring the temperature of the fluid in the chamber volume 110 as measured by temperature sensor 130, and the rate of decay of pressure from the chamber volume 110 as measured by the transducer 120, the flow rate through the MFC can be independently measured so that the MFC performance can be independently measured and verified (by comparing the set flow rate of the test MFC with the actual flow rate determined by the MFV 100).

Thus, upstream MFVs are capable of verifying an MFC's performance. One possible measurement of performance is to measure the rate of decay of pressure through the MFC when a fixed volume of gas is passed through the MFC, as identified in the following equation:

$$Q_o = \frac{V_t \cdot T_{stp}}{R \cdot P_{stp}} \cdot \frac{d(P/T)}{dt}, \quad (1)$$

wherein $Q_o$ is the MFV measured flow rate of the actual MFC output flow, $V_t$ is the total volume of the MFV system which is explained in the next paragraph, R is the universal gas constant, P and T are the gas pressure and temperature measurements, respectively, and $P_{stp}$ and $T_{stp}$ are the standard pressure (1.01325e5 Pa) and standard temperature (273.15K) constants, respectively.

The total volume of the MFC system, $V_t$, includes the known MFV chamber volume, $V_c$, and the external volume, $V_e$, between the MFV downstream valve 150 and the MFC control valve 340, and can be expressed as:

$$V_t = V_c + V_e. \quad (2)$$

The external volume, $V_e$, varies as a function of the system plumbing configuration and the MFC under test. The external volume must be precisely calibrated before the flow verification of the upstream MFV is carried out. For example, the external volume calibration may be based on the ideal gas law and the law of conservation of mass with the known facts of the MFV chamber volume ($V_c$), and the measured pressure and the temperature of the gas in the MFV chamber. The procedure may be described as follows:

1. Close the upstream valve of the MFV and open both the downstream valve of the MFV and the control valve of the MFC under test;
2. Pump down the system to a predetermined pressure level and close the control valve of the MFC under test;
3. Wait for the chamber pressure and the gas temperature to stabilize, and record the chamber pressure as $P_0$ and the gas temperature as $T_0$;
4. Close the downstream valve of the MFV and open the upstream valve of the MFV to allow the flow of gas into the MFV chamber;
5. Close the upstream valve of the MFV when the MFV chamber pressure reaches a predetermined level;
6. Wait for the chamber pressure and the gas temperature to stabilize and record the chamber pressure as $P_1$ and the gas temperature as $T_1$;
7. Open the downstream valve of the MFV and let the gas flow into the external volume;
8. Wait for the chamber pressure and the gas temperature to stabilize and record the chamber pressure as $P_2$ and the gas temperature as $T_2$;
9. Calculate the external volume according to the following equation:

$$V_e = \frac{(P_1/T_1 - P_2/T_2)}{(P_2/T_2 - P_0/T_0)} \cdot V_c \quad (3)$$

Figure 3:
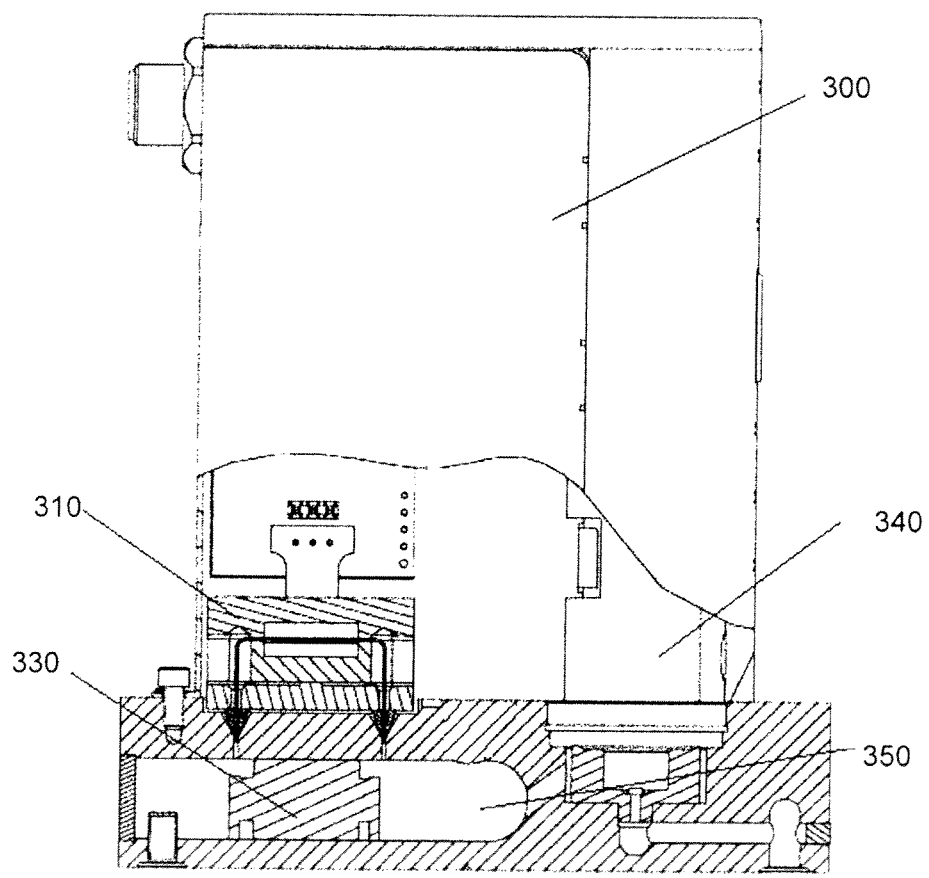
FIG. 3 shows a side view, partially cut away, of an example of a non-pressure insensitive mass flow controller.

The dead volume 350, $V_d$, in a MFC under test (shown in FIG. 3 generally at 300) is the portion of the flow path between the flow sensor 310 (shown with the laminar flow element 330) and the control valve 340. The dead volume is a characteristic of the MFC under test, which varies by vendor and type. Clearly, the dead volume is a part of the external volume ($V_e$) but it cannot be measured separately by the external volume calibration method described above.

The upstream MFV measures the actual flow output of the MFC under test based on Eq. (1). However, the flow rate measured by the upstream MFV ($Q_o$) is not the flow rate measured by the MFC flow sensor ($Q_s$) when the pressure is changing. A flow measurement error ($\Delta Q$) arises when the pressure in the dead volume is changing:

$$\Delta Q = Q_s - Q_o = \frac{V_d \cdot T_{stp}}{R \cdot P_{stp}} \cdot \frac{d(P/T)}{dt}, \quad (4)$$

For pressure insensitive MFCs such as the πMFC manufactured and sold by MKS Instruments of Wilmington, Mass. (the present assignee), these devices have pressure sensors in the flow path which can measure pressure change in the dead volume. Therefore, pressure insensitive MFCs can compensate for the flow error caused by the pressure fluctuation in the dead volume. In this case, the flow rate measured by the upstream MFV ($Q_o$) will match the flow rate controlled by the pressure insensitive MFCs if both are accurate.

For non-pressure insensitive MFCs, the flow error caused by the pressure fluctuation in the dead volume cannot be compensated by the MFC itself, because it does not have a pressure sensor. As a consequence according to Eq. (4), there is always a flow measurement discrepancy between the upstream MFV measurement and the MFC controlled flow rate even though the MFC is accurate at the normal constant pressure operating condition.

Figure 2:
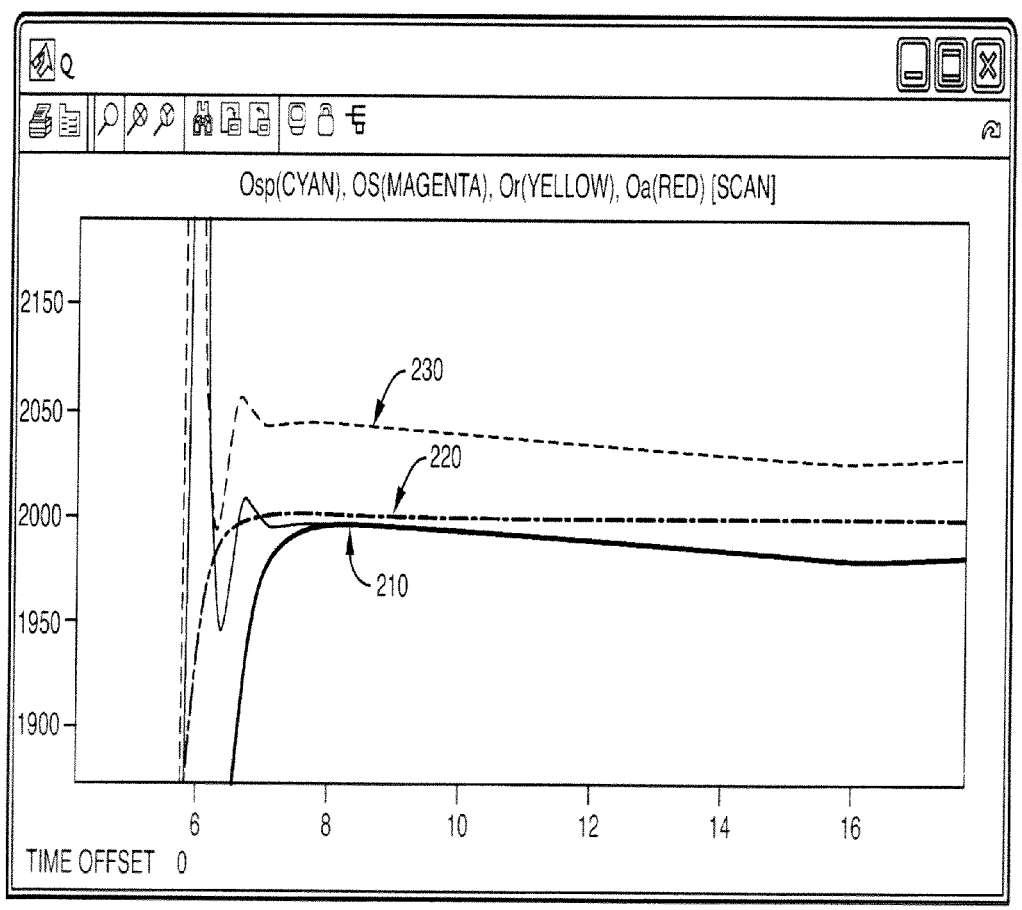
FIG. 2 shows simulation results identifying the errors addressed in this disclosure.

In the time graph represented in FIG. 2, typical responses of an MFV and a non-pressure insensitive MFC were simulated using $N_2$ gas where the initial measured temperature and pressure were 22° C. and 50 psia, respectively, the flow set point was 2000 sccm, run time was 30 seconds, the MFV volume was 200 cc, and the dead volume was 5 cc. The reported, measured flow 210 from the MFV varies from both the MFC flow set point 220 and the actual flow out of the MFC 230. Correcting the discrepancy between the actual flow out of the MFC 230 and the MFV measured flow into the MFC 210 is the subject of this disclosure. As expected, the error was equivalent to the proportion of the dead volume to the MFV volume (~50 sccm/2000 sccm=5 cc/200 cc).

To compensate for this flow measurement error, the dead volume must be taken into account when calculating the correct measured flow, Q, by the upstream MFV:

$$Q = \frac{(V_t - V_d) \cdot T_{stp}}{R \cdot P_{stp}} \cdot \frac{d(P/T)}{dt}. \quad (5)$$

Accordingly, the disclosed MFV accounts for the dead volume error by incorporating that volume into its calculation of the flow rate out of the MFC.

According to the present disclosure, the value of $V_d$ can be provided by the MFC manufacturer or can be estimated by the tester based on actual flows, expected flows, and errors. If the manufacturer provides the information, then a user of the MFV can enter the value into the processing equipment that includes the controller 160 so that the flow rate can be accurately calculated from the measured pressure and/or temperature values.

Further, this disclosure contemplates measuring and estimating the rate of decay in pressure and/or temperature in real time or by waiting until the system stabilizes. Waiting for stabilization provides the added benefit of permitting pressure measurement without compensating for corresponding temperature changes.

Also, when testing a pressure insensitive MFC according to aspects of the verifier disclosed herein, the $V_d$ value can be set to zero because the MFC has already accounted for the pressure drop in the dead volume.

While there has been illustrated and described particular embodiments of the present disclosure, it will be appreciated that numerous changes and modifications will occur to those skilled in the art. Accordingly, it is intended that the appended claims cover all those changes and modifications which fall within the spirit and scope of the present disclosure.

What is claimed:

1. An upstream mass flow verification system for improving the performance of a mass flow controller having a dead volume, the system comprising:
    an upstream volume capable of storing a test fluid, wherein the upstream volume is disposed along a flow path upstream of a mass flow controller, wherein the mass flow controller is under test and includes a given dead volume;
    a temperature sensor configured to sense the temperature within the upstream volume;
    a pressure sensor configured to sense the fluid pressure within the upstream volume; and
    a processor configured to receive temperature and pressure signals from the temperature sensor and pressure sensor, respectively, to determine the flow rate of test fluid through the mass flow controller based on the rate of decay of pressure over temperature (P/T) within the upstream volume and which compensates for flow rate errors caused by the given dead volume within the mass flow controller;
    wherein the processor is configured to, in determining the flow rate of the test fluid through the mass flow controller, compensate for the given dead volume for either of (i) the case where the mass flow controller is pressure-insensitive, or (ii) the case where the mass flow controller is pressure-sensitive.

2. The system of claim 1, wherein the processor is further configured to determine the rate of decay of pressure or temperature in accordance with the following equation, wherein the flow is measured according to the following:

$$Q = \frac{(V_t - V_d) \cdot T_{stp}}{R \cdot P_{stp} \cdot T} \cdot \frac{d(P/T)}{dt}$$

wherein
    Q is the measured flow rate,
    $V_t$ the total volume of the mass flow verification (MFV) system,
    $V_d$ represents the dead volume of the mass flow controller under test,
    R is the universal gas constant,
    P and T are the gas pressure and temperature respectively, and
    $P_{stp}$ and $T_{stp}$ are the standard pressure (1.01325e5 Pa) and standard temperature (273.15K) respectively.

3. The system of claim 2, wherein the processor is further configured to wait until the system stabilizes before making the determination of the rate of decay of pressure over temperature (P/T).

4. The system of claim 1, wherein the dead volume is set to zero by the processor.

5. The system of claim 1, wherein a value of the dead volume is entered by a user of the system.

6. The system of claim 1, further comprising an input valve for controlling the flow of test fluid into the volume, and an output valve for controlling the flow of fluid from the volume through the mass flow controller, wherein the output valve is closed and input valve is opened so as to fill the volume until it reaches a measurable pressure level, and wherein the input valve is then closed, and the output valve is open to allow fluid to flow from the volume through the mass flow controller.

7. A method of improving the performance of a test mass flow measurement device that is under test and has a given dead volume, the method comprising:
    with a pressure sensor, measuring an established pressure of a test fluid in a fixed volume disposed along a flow path upstream of the test mass flow measurement device;
    with a temperature sensor, measuring a temperature of the test fluid in the fixed volume upstream of the test mass flow measurement device;
    opening a valve to transfer the test fluid from the fixed volume through the test mass flow measurement device, wherein the valve is disposed along a flow path between the fixed volume and the test mass flow measurement device; and
    determining, with a processor, a mass flow rate through the mass flow measurement device under test based on the rate of change in pressure over temperature (P/T) of the test fluid within the fixed volume,
    wherein the step of determining includes compensating for flow rate errors caused by the given dead volume within the mass flow measurement device under test;
    wherein, in determining the flow rate of test fluid through the mass flow measurement device, the processor is configured to compensate for the given dead volume for either of (i) the case where the mass flow measurement device is pressure-insensitive, or (ii) the case where the mass flow measurement device is pressure-sensitive.

8. The method of claim 7, wherein determining the calculation of the mass flow rate includes determining the flow according to the following:

$$Q = \frac{(V_t - V_d) \cdot T_{stp}}{R \cdot P_{stp} \cdot T} \cdot \frac{d(P/T)}{dt}$$

wherein
    Q is the measured flow rate,
    $V_t$ is the total volume of the MFV system,
    $V_d$ represents the given dead volume of the mass flow measurement device under test,
    R is the universal gas constant,
    P and T are the gas pressure and temperature respectively, and
    $P_{stp}$ and $T_{stp}$ are the standard pressure (1.01325e5 Pa) and standard temperature (273.15K) respectively; and
    wherein the processor is further configured to determine the rate of decay of pressure over temperature (P/T) in accordance with the foregoing equation.

9. The method of claim 8, wherein the processor is further configured to wait until the system stabilizes before making the determination of the rate of decay of pressure over temperature (P/T).

10. The method of claim 7, further comprising entering a value of the given dead volume received from the manufacturer of the mass flow measurement device under test.

11. The method of claim 10, wherein the entered value is zero.

12. The method of claim 7, wherein the flow rate is calculated after the temperature has stabilized.

\* \* \* \* \*